J. ARMSTRONG, Jr.
Corn-Planters.
No. 153,147.
Patented July 21, 1874.
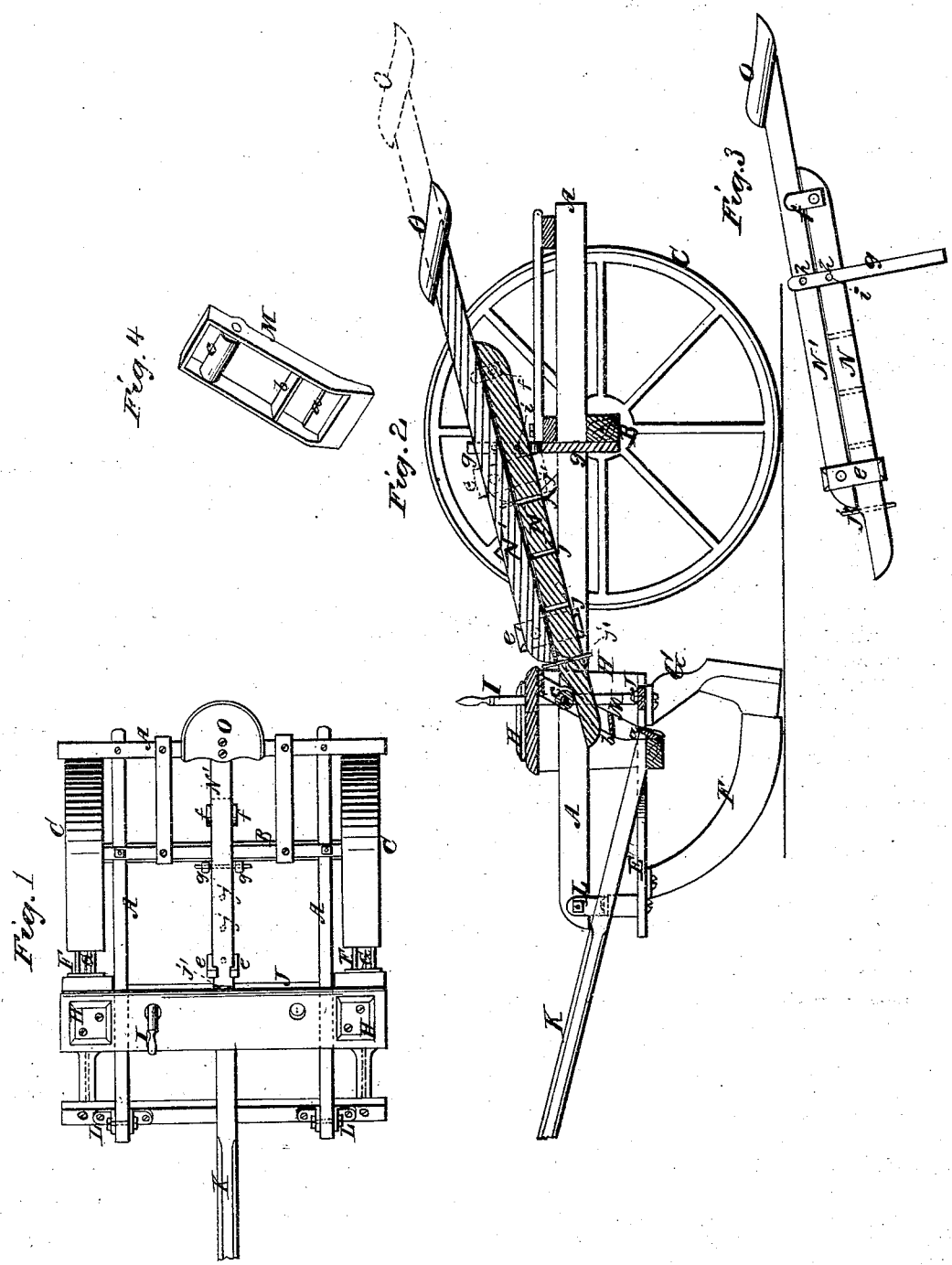
Witnesses.
James Martin Jr.
J. N. Campbell
Inventor.
James Armstrong Jr.
by Mason Fenwick & Lawrence
Attys

UNITED STATES PATENT OFFICE.

JAMES ARMSTRONG, JR., OF ELMIRA, ILLINOIS.

IMPROVEMENT IN CORN-PLANTERS.

Specification forming part of Letters Patent No. 153,147, dated July 21, 1874; application filed May 11, 1874.

*To all whom it may concern:*

Be it known that I, JAMES ARMSTRONG, Jr., of Elmira, county of Stark and State of Illinois, have invented a new and useful Improvement in Corn-Planters; and I do hereby declare that the following is a full, clear, and exact description thereof, reference being had to the accompanying drawing making part of this specification, in which—

Figure 1 is a top view of a corn-planter with my improvement applied to it. Fig. 2 is a longitudinal section of the same. Fig. 3 is a side view of the seat-supporting lever detached from the machine. Fig. 4 is a perspective view of the box and roller of the lever detached from the machine.

The nature of my invention consists, first, in an extensible seat-supporting lever in combination with a wheeled supporting-frame, and a hinged frame which has the furrow runners or cutters and the corn-planter constructed upon it, whereby the depth at which the runners enter the ground and the corn is planted is regulated by the weight of the driver, accordingly as the seat of the driver is moved from or toward the fulcrum of the lever. My invention also consists in a certain detail of construction whereby the seat-supporting lever is employed, in the manner set forth in the foregoing statement of the nature of the first part of my invention.

To enable others skilled in the art to make and use my invention I will proceed to describe it.

A is the supporting-frame; B, its axle; C C, the supporting-wheels of the machine; E, the runner and corn-planter frame; F F, the runners; G, the tubes through which the grain descends into the furrows made by the runners; H H, the corn-hoppers; I, hand-levers for operating the laterally-moving corn-dropping slide J of the hoppers; K, the tongue attached to the frame E; and L L are hinges by which the frame E is attached to the front of the frame A, as shown; M, a metal box constructed with a back stop, $h$, a transverse stop, $b$, and a friction-roller bearing, $c$, as shown. This box is placed under the seat-board of the hoppers, and is fastened to the same and to the back cross-bar E' of the frame E. Its lower back stop serves as an end plate for the rear end of the tongue, and its transverse stop and roller serve the purpose presently set forth. N N' is a seat-supporting lever, constructed so that its part N' slides back and forth on N, in guides $e f$, as shown. O is the driver's seat on the outer end of the upper portion N' of the lever. The part N of the lever has its fulcrum on the frame A in a forked supporting-standard, $g$, which extends up from the axle B. This standard has two or more sets of holes, $h$, to receive the fulcrum-pin $i$, so that the part N of the lever may be set higher or lower, as desired. This part of the lever has a series of holes, $j$, cut vertically through it, into which a stop-pin, $j'$, is inserted accordingly as the part N' of the lever is moved back and forth. The spaces between the holes are made of such a length, with respect to the weight of the frame E and its appendages, that the adjustment of the lever from one to the other will enable the driver to determine almost to a certainty the depth at which the runners enter the ground, and that the corn is being planted. This, of course, will be subject to the different weights of drivers, and it may be necessary for the driver to move the lever back two or more holes to arrive at the desired depth. The lever, thus constructed, has its front end inserted through the box M under the roller $c$ and above the stop $b$, the latter serving to prevent it falling down out of place, and the former serving as an anti-friction bearing by which to apply its power for lifting the corn-planter and runner-frame to the proper height.

It will be seen that when it is desired to plant deeper the driver can effect this by sliding the seat-bar, with seat, forward to any proper point, as this will give him less leverage over the fulcrum to lift on the runner and corn-planter frame; and when it is desired to plant shallower he only has to slide the seat-bar, with seat, backward, thus lengthening the leverage and enabling him to lift more on the said frame. In either of the named adjustments the stop-pin $j'$ is removed and again inserted after the adjustment is effected.

When the driver wants to elevate the runners or cutters from the ground, for turning or other purposes, he simply slides the part N' backward, so as to give him leverage enough to raise the frame E from the ground. By leaving the set-pin in place he knows the depth at which he was planting, and he instantly can readjust the seat to the same place.

What I claim as my invention, and desire to secure by Letters Patent, is—

1. The extensible lifting and regulating seat-lever N N', in combination with the wheeled frame A and the pivoted runner or cutter and corn-planter frame E, substantially as described.

2. In a corn-planter, the metal box M constructed with stops $a$ $b$, and with apertures to secure the journals of the friction-roller, as and for the purpose set forth.

JAMES ARMSTRONG, JR.

Witnesses:
DAVID J. WALKER,
SAML. BURGE.